July 22, 1958  M. D. RIGTERINK  2,844,693
WIRE-WOUND VITREOUS ENAMEL RESISTORS
Filed Oct. 25, 1954

INVENTOR
M. D. RIGTERINK
BY Edwin B. Cave
ATTORNEY

United States Patent Office 2,844,693
Patented July 22, 1958

2,844,693
WIRE-WOUND VITREOUS ENAMEL RESISTORS

Merle D. Rigterink, Basking Ridge, N. J., assignor to Bell Telephone Laboratories, Incorporated, New York, N. Y., a corporation of New York Application October 25, 1954, Serial No. 464,298

10 Claims. (Cl. 201—63)

This invention relates to enamel-coated, wire-wound resistors, to ceramic enamel coatings therefor, and to the processes of making such resistors and coatings.

In the fabrication of coated wire-wound resistors, ceramic enamels are applied as an aqueous suspension of a finely ground enamel frit. This suspension, or slip, is then fired. In the firing step, difficulties may be encountered, particularly with resistors having wires wound on a ceramic core.

Often, at firing temperatures, the wire coils of the resistor, expanding more than the refractory core supporting them, may tend to loosen on the core. The molten ceramic coverings may then cause dislodging of the wires due to contractile surface-tension forces in the liquid coating, particularly if the coating is viscous and the heating is slow.

In the present invention, an undercoat made up of both an enamel and a refractory substance, and thus having both a liquid and a solid phase at firing temperatures, is first applied, and then later covered with a second outer coat of another corrosion-resistant ceramic. The use of a two-phase undercoating materially aids in counteracting the problem of "wire pulling" described above.

In the present invention, incorporation of a solid pulverized refractory into an enamel undercoat accomplishes the aim of securing the resistance wires on the ceramic core, as deposition of the solid refractory between the wires serves as a mechanical hindrance to lateral wire movement. With the wires thus secured in position on the core, the use of a relatively low-melting enamel undercoat is feasible, and such an enamel, if also of low viscosity and low surface tension when molten, can be chosen as a vehicle for the refractory. These low-melting enamels generally have high thermal coefficients of expansion and, thus, tend to match the metal resistance wires in this property. Such a correspondence in thermal expansion coefficients will aid in reducing cracking and crazing of the enamel cover if the resistor is subjected to extreme temperature variations. The high-melting corrosion-resistant ceramics used as cover coats will spread more easily, providing a more effective cover, if the low melting materials, used as the undercoat or base over which successive cover coats are applied, are similar in composition with the secondarily applied high melting outer covering.

Figure 1:
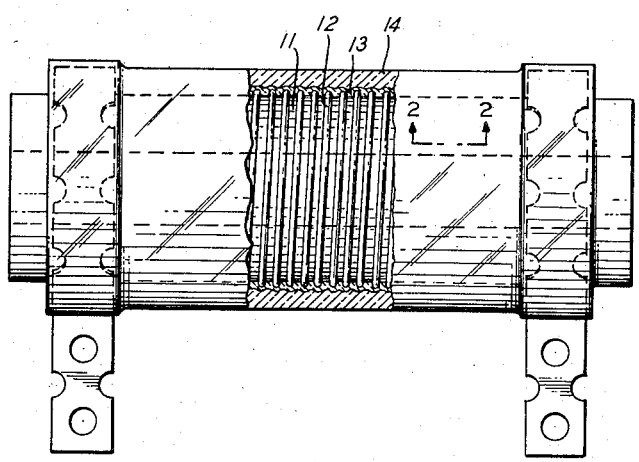
Figure 2:
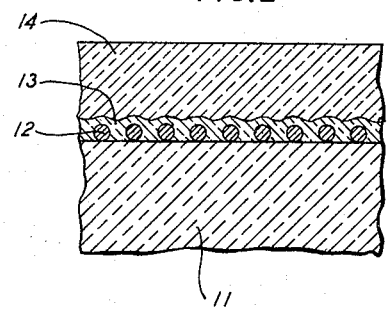

Fig. 1 of the accompanying drawing shows a front elevation, partly in section, of an enamel-coated wire-wound resistor; and Fig. 2 is an enlarged drawing, in section, of a portion of the resistor at the region indicated by the lines 2—2 in Fig. 1.

Both figures show a ceramic core 11, on which is helically wound resistance wire 12. Covering the wires on the core piece is a ceramic undercoat 13, and a ceramic cover coat 14 applied over the undercoat.

Enamels which are suitable for use as undercoatings ideally have low viscosity and low surface tension at the firing temperatures of 650° C. to 800° C. used to fix the coatings. Frit compositions which will melt at low enough temperatures to be highly fluid in the range used for firing are preferably chosen.

The frit materials which best exhibit the desired properties are the borosilicate glasses. Alkali-metal borosilicates are glasses suitable for covering wires drawn from any alloy. Lead borosilicates also give glossy, adherent coatings. However, at firing temperatures, side reactions between the lead compounds in these latter enamel frits and copper found in some wire alloys make the lead borosilicates less desirable as a coating for those wires with copper content.

Lead borosilicate glasses compounded within the composition ranges given below have proved satisfactory for coating copper-free wires.

Table 1

| | Percent by weight |
|---|---|
| PbO | 20–40 |
| $SiO_2$ | 20–50 |
| $B_2O_3$ | 10–20 |
| $Al_2O_3$ | 0–4 |
| ZnO | 0–10 |
| NaF | 0–3 |
| $Na_2O$ | 0–3 |
| $K_2O$ | 2–5 |
| $Li_2O$ | 3–10 |
| $SrCl_2$ | 0–2 |
| CoO | 0.5–8 |
| $Cr_2O_3$ | 0–1 |

Alkali metal borosilicate glasses which may be used on any wire regardless of its copper content, are specified in Table 2.

Table 2

| | Percent by weight |
|---|---|
| $SiO_2$ | 45–55 |
| $B_2O_3$ | 10–20 |
| $Al_2O_3$ | 0–10 |
| $Na_2O$ | 10–20 |
| $K_2O$ | 2–8 |
| $Li_2O$ | 5–15 |
| CoO | 0.5–5 |
| $Cr_2O_3$ | 0–1 |
| CuO | 0–1 |
| NiO | 0–1 |

Specific examples of lead borosilicate glasses which have proved particularly suitable for coating wires such as "nichrome 5," an alloy of 80 percent nickel and 20 percent chromium, are given in Table 3.

Table 3

| | Percent by Weight | | |
|---|---|---|---|
| | A | B | C |
| PbO | 24.0 | 24.0 | 27.0 |
| $SiO_2$ | 46.8 | 46.8 | 30.3 |
| $B_2O_3$ | 12.5 | 12.5 | 16.6 |
| $Al_2O_3$ | | | 2.4 |
| ZnO | 5.0 | 5.0 | 4.8 |
| NaF | 1.8 | | 1.7 |
| $Na_2O$ | | 1.8 | |
| $K_2O$ | 3.0 | 3.0 | 2.8 |
| $Li_2O$ | 5.0 | 5.0 | 7.0 |
| $SrCl_2$ | 1.0 | 1.0 | 1.0 |
| CoO | 0.5 | 0.5 | 6.0 |
| $Cr_2O_3$ | 0.4 | 0.4 | 0.4 |
| | 100 | 100 | 100 |

Specific examples of non-lead-bearing frits, miscible with lead-bearing cover enamels, and particularly suitable for use on copper alloys such as "Advance" wire, an alloy of 43 percent nickel and 57 percent copper, are given in Table 4.

Table 4

|  | Percent by weight | | |
|---|---|---|---|
|  | D | E | F |
| SiO₂ | 51.8 | 52.2 | 46.8 |
| B₂O₃ | 12.7 | 12.7 | 12.7 |
| Al₂O₃ | 6.6 | 6.6 | 6.6 |
| Na₂O | 14.2 | 14.2 | 14.2 |
| K₂O | 5.2 | 5.2 | 5.2 |
| Li₂O | 7.7 | 8.1 | 12.7 |
| CoO | 0.5 | 1.0 | 0.5 |
| Cr₂O₃ | 0.4 |  | 0.4 |
| CuO | 0.5 |  | 0.5 |
| NiO | 0.4 |  | 0.4 |
|  | 100 | 100 | 100 |

CuO and NiO are added to the frits to help saturate them with these components, as their presence reduces chemical attack of nickel and copper in wire alloys by the slip at high firing temperatures. $Cr_2O_3$ in addition to lending a color, similarly prevents attack of chromium alloys by the molten slip.

Although oxides have been specified in the foregoing tables, other compounds which would furnish the same proportions as oxides to the final frit composition may be employed with equivalent results.

The refractory substances mixed with the frits specified above to furnish the solid phase of the undercoat at firing temperatures had best have melting points greater than the maximum firing temperature of 800° C. The solubility of the refractory in the molten frit is, preferably, low enough so that little solution of the refractory occurs in the period needed for firing. Since the refractories function partially as suspending agents in the slip, naturally lamellar materials with good suspending properties are desirable. The refractory should have a particle size less than 50 microns and preferably between 1 and 10 microns. Refractory materials which are more coarse in their natural state may be adaptable if they permit crushing and grinding to the required size. A low content of organic material is preferred, as firing often produces combustion, gassing, and bubble formation if the organic content is excessive.

Examples of refractories which have been found particularly suitable are koalin or china clay, talc, and wollastonite.

In mixing the slips for application of the undercoat, the ratio by weight of frit to refractory and suspending clays varies considerably. In those slips containing lead borosilicate frits, the weight-ratio of frit to refractory may lie between one and twenty as approximate limits while for the alkali-metal borosilicates, suitable for coating even copper-bearing wire alloys, the frit-refractory weight-ratio is lower, generally lying between the approximate limits of one-half and three. The frits used in the slips should preferably be ground to pass a 325 mesh sieve.

An aqueous slip is compounded which will remain stable for relatively long periods, have correct set-up properties to facilitate application to the resistors, and, of course, hold the pulverized frit in suspension. In addition to frit and refractory, set-up agents are added to the aqueous suspension to impart thixotropic properties to the slip, minimizing dripping and running of the slip after application.

For coating copper-free wires, using lead borosilicate frits, the following slip composition ranges proved suitable.

Table 5

| | Parts by weight |
|---|---|
| Pulverized frit | 60–95 |
| Clay | 5–40 |
| Calcined clay | 0–20 |
| Bentonite | 0–2 |

| | Parts by weight |
|---|---|
| Hydrated aluminum oxide ($Al_2O_3 \cdot xH_2O$) | 0–5 |
| Magnesium oxide | 0–2 |
| Water | 100–200 |

When the suspending liquid is removed by firing, the resultant coating may comprise 45 weight percent to 95 weight percent of lead borosilicate enamel, and 5 weight percent to 50 weight percent of refractory clays.

The compositions of slips incorporating alkali metal borosilicate frits, suitable for use on any wire, may vary between the limits set forth below.

Table 6

| | Parts by weight |
|---|---|
| Pulverized frit | 40–60 |
| Clay | 20–50 |
| Calcined clay | 0–30 |
| Bentonite | 0–2 |
| Hydrated aluminum oxide ($Al_2O_3 \cdot xH_2O$) | 0–5 |
| Magnesium oxide | 0–2 |
| Water | 100–200 |

The removal of volatile constituents from such slips will give ceramic compositions comprising 30 weight percent to 75 weight percent of an alkali metal borosilicate enamel and 25 weight percent to 67 weight percent of refractory clays.

Specifically, an example of a slip containing a lead borosilicate frit and having a high frit-refractory ratio, is given in Table 7.

Table 7

| | Parts by weight |
|---|---|
| Frit A of Table 1 (325 mesh) | 75.0 |
| "Edgar Plastic Kaolin" (washed Florida clay) | 22.5 |
| "Setit" (hydrated $Al_2O_3$, approximately $Al_2O_3 \cdot 6H_2O$) | 2.25 |
| Magnesium oxide | 0.25 |
| Water | 170 |

"Edgar Plastic Kaolin" is washed Florida clay supplied by the Edgar Plastic Kaolin Company, Edgar, Florida, and has the following approximate ultimate analysis, as described in Buletin No. 3, November, 1933, of the Edgar Pastic Kaolin Company:

| | |
|---|---|
| Ignition loss | 14.95 |
| SiO₂ | 46.95 |
| Al₂O₃ | 36.75 |
| Fe₂O₃ | 0.80 |
| CaO | 0.15 |
| MgO | 0.20 |
| Alkalies | 0.24 |
| TiO₂ | 0.18 |
| | 100.22 |

"Setit" is hydrated aluminum oxide containing approximately 48.20 percent $Al_2O_3$, and 51.10 percent of materials lost on ignition (moisture), the balance being small quantities of oxide impurities. "Setit" is a product of the Titanium Alloy Manufacturing Company, New York, New York.

A slip containing an alkali-metal borosilicate frit, and having a lower frit-refractory ratio is specifically exemplified in Table 8.

Table 8

| | Parts by weight |
|---|---|
| Frit D of Table 2 (325 mesh) | 52.5 |
| "Edgar Plastic Kaolin" (washed Florida clay) | 25.0 |
| "Edgar No-Karb" clay (sized Georgia clay) (calcined at 1400° C.) | 20.0 |
| "Setit" (hydrated aluminum oxide, approximately $Al_2O_3 \cdot 6H_2O$) | 2.5 |
| Water | 180 |

"Edgar No-Karb" clay is sized Georgia clay supplied by the Edgar Plastic Kaolin Company, Edgar, Florida.

As described in that company's Bulletin No. 3, November, 1933, it has the following ultimate analysis:

| | |
|---|---|
| Moisture at 100° C | 0.30 |
| Ignition loss | 13.65 |
| $SiO_2$ | 42.01 |
| $Al_2O_3$ | 41.48 |
| $Fe_2O_3$ | 0.03 |
| CaO | 0.60 |
| MgO | 0.47 |
| Alkalies | 0.47 |
| $TiO_2$ | 0.99 |
| | 100.00 |

The frits are usually prepared by fusion of the ingredients to form a molten glassy material which is poured into cold water to give a solid shattered glass. The frit is then pulverized in a ball mill or equivalent pulverizing device until of the proper fineness, preferably finer than 325 mesh.

The undercoat slips are prepared by mixing all the ingredients, excepting the frit, using an Eppenbach homogenizer or similar mixing device, for one-half hour. The previously ground and sifted frit is then added and mixing continued for another minute. The resulting suspension is aged for a minimum period of one-half hour, and is then ready for use. When properly made, the slips are homogeneous and stable for periods of at least a week.

After application to the wire-bound resistor by dipping or flowing, it is desirable, if possible, to brush out air bubbles entrapped between the wires and under the slip. The average thickness of the applied undercoat should be of the same magnitude as the diameter of the resistance wire coated. A very thin coat is to be applied on fine resistance wires or surface tension forces may become overwhelmingly great and wires may be dislodged. For heavy wire, two coatings, with an intermediate and a final firing, give an especially effective undercoat.

Firing itself is accomplished in the temperature range from 650° C. to 800° C. As fast a firing as is feasible without thermally shocking the ceramic cores aids in reducing wire pulling. A total firing cycle of one hour, with a maximum temperature of 735° C. may be used with success.

Cover coats for the wire-wound resistors undercoated in the manner described above preferably should have a corrosion and weathering resistance commensurate with their greater exposure to adverse conditions. In addition, the cover coat is chosen to be compatible with the lead borosilicate or alkali-metal borosilicate undercoats over which it is applied. A high-firing enamel is desirable, as such enamels generally have thermal expansion coefficients more nearly equal to the expansion coefficients of the ceramic cylinder core which they cover.

In all these respects, lead borosilicate enamels have been found to be most satisfactory.

These lead borosilicate enamel frits preferably lie within the composition limits set by Table 9.

Table 9

| | Percent by weight |
|---|---|
| PbO | 20–40 |
| $SiO_2$ | 20–50 |
| $B_2O_3$ | 10–20 |
| $Al_2O_3$ | 0–4 |
| ZnO | 0–10 |
| NaF | 0–3 |
| $K_2O$ | 2–5 |
| $Li_2O$ | 0–3 |
| $SrCl_2$ | 0–2 |
| CoO | 0.5–8 |
| $Cr_2O_3$ | 0–1 |
| $TiO_2$ | 1–10 |
| $ZrO_2$ | 0–2 |

Examples of specific lead borosilicate frits which have proved exceptionally good cover coat material are described in Table 10.

Table 10

| | Percent by weight | | |
|---|---|---|---|
| | G | H | J |
| PbO | 27.0 | 24.0 | 28.2 |
| $SiO_2$ | 30.3 | 47.8 | 34.8 |
| $B_2O_3$ | 16.6 | 12.5 | 17.3 |
| $Al_2O_3$ | 2.4 | | 2.5 |
| ZnO | 4.8 | 5.0 | 5.0 |
| NaF | 1.7 | 1.8 | 1.8 |
| $K_2O$ | 2.8 | 3.0 | 3.0 |
| $Li_2O$ | 1.0 | 1.0 | 1.0 |
| $SrCl_2$ | 1.0 | 1.0 | 1.0 |
| CoO | 6.0 | 0.5 | 2.0 |
| $Cr_2O_3$ | 0.4 | 0.4 | 0.4 |
| $TiO_2$ | 5.0 | 2.0 | 2.0 |
| ZrO | 1.0 | 1.0 | 1.0 |
| | 100 | 100 | 100 |

The additional materials titanium dioxide and zirconium oxide furnish clarity and resiliency to the enamel, respectively, and both give added protection against corrosion.

Cover-coat frits should be homogenized into an aqueous suspending medium with the proper consistency and set-up characteristics to permit easy and rapid application of the enamel to the undercoated resistors. The resulting slips should, for greatest convenience, be stable for at least a day to eliminate production delays occasioned by a need for fresh material. Gelling agents and clays or bentonite with good suspending properties are the materials used to compound suitable slip media.

The clays chosen for the slips are again those of the proper structure and particle size to enhance suspension. The melting points and solubility of the clays in the molten frit are such as to give a smooth enamel coating, fluid at the firing temperatures of 650° C. to 800° C. Proper anchoring of the resistance wires by the undercoat permits the use of finely ground materials in the cover slip. The particle sizes for the suspending clays are usually smaller than 5 microns, and the frits themselves are pulverized to between 120 mesh and 230 mesh.

A suitable suspending medium for the cover coat frits is specified in Table 11 below.

Table 11

| | Parts by weight |
|---|---|
| Water | 100 |
| Clay or bentonite | 5–15 |
| Hydrated aluminum oxide ($Al_2O_3.xH_2O$) | 0.5–2 |

An example of a suspending medium of the type in Table 11 which proved particularly effective is given in Table 12.

Table 12

| | Parts by weight |
|---|---|
| Water | 100 |
| M–16 clay (mixed clays) | 10.0 |
| "Setit" (hydrated aluminum oxide, approximately $Al_2O_3.H_2O$) | 1.0 |

"M–16" clay is a mixture of enamel clays supplied by the Pemco Corporation, Baltimore, Maryland.

For the cover coat, the suspending medium is first prepared by ball-milling the dry ingredients for eight hours. Water is added, and the suspension homogenized for one-half hour. The finely ground and sifted cover coat frit is then manually mixed with the suspending medium to give the cover coat slip.

A mixture of 45 parts of suspending medium with 100 parts of 170 mesh cover coat frit gives a good slip. The proportions are only exemplary, however, as thickening or thinning may be accomplished as desired by adding up to one-quarter of 1 percent of potassium chloride, or additional water. A slip of the proper consistency for the demands of a particular process of application is thus obtainable.

Application and firing of the cover slip is done in a fashion similar to that used for the undercoat. However, the average thickness of the cover coat is generally 3 to 5 times the diameter of the resistance wire.

Although specific embodiments of this invention have been shown and described it will be understood that they are but illustrative, and that various modifications may be made therein without departing from the scope and spirit of this invention.

What is claimed is:

1. An electrical resistor comprising a metal resistance wire wound on a ceramic core, a ceramic enamel undercoat bonded to said wire and said ceramic core, said undercoat consisting essentially of a continuous vitreous phase of an enamel which is a member of the group consisting of alkali metal borosilicate enamels and lead borosilicate enamels, said vitreous phase having finely divided particles of refractory material dispersed therethrough, which refractory material constitutes a solid second phase within the molten fluid vitreous phase during firing, and a ceramic enamel outercoat bonded to said undercoat, said outercoat consisting essentially of a lead borosilicate enamel.

2. The electrical resistor as described in claim 1 for which said ceramic undercoat consists essentially of 45 weight percent to 95 weight percent of a lead borosilicate enamel and 5 weight percent to 50 weight percent of a finely divided refractory clay dispersed throughout said enamel.

3. The electrical resistor as described in claim 1 for which said ceramic undercoat consists essentially of 30 weight percent to 75 weight percent of an alkali metal borosilicate enamel and 25 weight percent to 67 weight percent of a finely divided refractory clay dispersed throughout said enamel.

4. The process for forming enamel coatings on a wire-bound electrical resistor which comprises applying to the surface of said resistor a primary slip consisting essentially of a mixture of water, a finely divided refractory material, and a finely divided frit of an enamel which is a member of the group consisting of alkali metal borosilicate enamels and lead borosilicate enamels, firing this primary slip at a temperature at which the frit becomes molten but the refractory material remains in the solid phase, and then applying a second slip consisting essentially of water, a suspending clay, and a finely divided lead borosilicate enamel frit to the surface of said resistor and firing this second slip to form an outer enamel cover.

5. The process as described in claim 4 in which said frit in said primary slip is a frit of a lead borosilicate enamel, and in which the ratio, by weight, of finely divided lead borosilicate frit to finely divided refractory material in said primary slip lies btween 1 and 20.

6. The process as described in claim 4 in which said frit in said primary slip is a frit of an alkali metal borosilicate enamel, and in which the ratio, by weight, of finely divided alkali metal borosilicate frit to finely divided refractory material in said primary slip lies between 0.5 and 3.

7. The process of forming a ceramic-coated wire-wound resistor, which process comprises applying a slip consisting essentially of water, finely divided refractory clay, and a finely divided lead borosilicate frit, in which slip the ratio by weight of frit to clay lies between 1 and 20, to the surface of the resistor and firing said resistor at temperatures between 650° C. and 800° C., at which temperatures the finely divided lead borosilicate frit in said slip becomes molten while the finely divided refractory clay in said slip remains in the solid phase.

8. The process of forming a ceramic-coated wire-wound resistor which process comprises applying a slip consisting essentially of water, finely-divided refractory clay, and a finely divided alkali metal borosilicate frit, in which slip the ratio by weight of frit to clay lies between 0.5 and 3, to the surface of the resistor and firing said resistor at temperatures between 650° C. and 800° C., at which temperatures the finely divided alkali metal borosilicate frit in said slip becomes molten while the finely divided refractory clay in said slip remains in the solid phase.

9. A ceramic slip of the following composition:

| | Parts by weight |
|---|---|
| Lead borosilicate frit | 60–95 |
| Clay | 5–40 |
| Calcined clay | 0–20 |
| Bentonite | 0–2 |
| Hydrated aluminum oxide ($Al_2O_3 \cdot xH_2O$) | 0–5 |
| Magnesium oxide | 0–2 |
| Water | 100–200 | said lead borosilicate frit comprising the following ingredients:

| | Percent by weight |
|---|---|
| $PbO$ | 20–40 |
| $SiO_2$ | 20–50 |
| $B_2O_3$ | 10–20 |
| $Al_2O_3$ | 0–4 |
| $ZnO$ | 0–10 |
| $NaF$ | 0–3 |
| $Na_2O$ | 0–3 |
| $K_2O$ | 2–5 |
| $Li_2O$ | 3–10 |
| $SrCl_2$ | 0–2 |
| $CoO$ | 0.5–8 |
| $Cr_2O_3$ | 0–1 |

10. A ceramic slip of the following composition:

| | Parts by weight |
|---|---|
| Alkali metal borosilicate frit | 40–60 |
| Clay | 20–50 |
| Calcined clay | 0–30 |
| Bentonite | 0–2 |
| Hydrated aluminum oxide ($Al_2O_3 \cdot xH_2O$) | 0–5 |
| Magnesium oxide | 0–2 |
| Water | 100–200 | said alkali metal borosilicate frit comprising the following ingredients:

| | Percent by weight |
|---|---|
| $SiO_2$ | 45–55 |
| $B_2O_3$ | 10–20 |
| $Al_2O_3$ | 0–10 |
| $Na_2O$ | 10–20 |
| $K_2O$ | 2–8 |
| $Li_2O$ | 5–15 |
| $CoO$ | 0.5–5 |
| $Cr_2O_3$ | 0–1 |
| $CuO$ | 0–1 |
| $NiO$ | 0–1 |

References Cited in the file of this patent

UNITED STATES PATENTS

| 100,725 | Clark | Mar. 15, 1870 |
| 2,269,176 | Booth et al. | Jan. 6, 1942 |
| 2,321,840 | McDougal | June 15, 1943 |
| 2,396,979 | Baldwin | Mar. 19, 1946 |
| 2,398,686 | Zander | Apr. 16, 1946 |
| 2,425,032 | Deyrup | Aug. 5, 1947 |
| 2,475,469 | Bennett et al. | July 5, 1949 |
| 2,508,511 | Goodman | May 23, 1950 |
| 2,508,735 | Van Horn | May 23, 1950 |

FOREIGN PATENTS

| 231,679 | Switzerland | 1944 |